United States Patent [19]

Harris et al.

[11] Patent Number: 5,030,704

[45] Date of Patent: Jul. 9, 1991

[54] SELF POLYMERIZABLE PHENYLQUINOXALINES, THEIR PREPARATION AND USE IN POLYPHENYLQUINOXALINE HOMOPOLYMERS AND COPOLYMERS

[75] Inventors: Frank W. Harris, Akron; Joseph E. Korleski, Massillon, both of Ohio

[73] Assignee: The University of Akron, Akron, Ohio

[21] Appl. No.: 368,572

[22] Filed: Jun. 20, 1989

[51] Int. Cl.$^5$ .............................................. C08G 73/06
[52] U.S. Cl. .................................... 528/125; 528/126; 528/128; 528/220; 528/222; 528/229; 525/471; 525/534; 525/535
[58] Field of Search ............... 528/125, 126, 128, 220, 528/222, 229; 525/471, 534, 535

[56] References Cited

U.S. PATENT DOCUMENTS

| | | |
|---|---|---|
| 3,326,915 | 6/1967 | Jackson et al. |
| 3,852,243 | 12/1974 | Hergenrother |
| 3,852,244 | 12/1974 | Heath et al. |
| 3,956,238 | 5/1976 | Heath et al. |
| 4,125,725 | 11/1978 | Duffy ................................. 544/353 |
| 4,375,536 | 3/1983 | Hergenrother ....................... 528/125 |
| 4,788,271 | 11/1988 | Hergenrother et al. ............. 528/125 |
| 4,908,426 | 3/1990 | Hergenrother et al. ............. 528/125 |

OTHER PUBLICATIONS

Connell et al., "Synthesis of Polyphenylquinoxalines Via Aromatic Nucleophilic Displacement", *Polymer Prep.* vol. 29, 1988.
Harris et al., *Polymer Prep.* vol. 28, 1987.
Connell et al., *Polymer Prep.*, vol. 60, 1989.
Labadie et al., *Polymer Prep.* vol. 28, 1987.
Bass et al., *Polymer Prep.* vol. 29, 1988.
Hendrick et al., *Macromolecules*, vol. 21, 1988.
Labadie et al., *Extended Abstracts*, vol. 87-2, 1665, 1987.

*Primary Examiner*—John Kight, III
*Assistant Examiner*—Sam A. Acquah
*Attorney, Agent, or Firm*—Oldham & Oldham

[57] ABSTRACT

A polyphenylquinoxaline which consists of 1 to 100 mole percent of structural elements of the formula (IV)

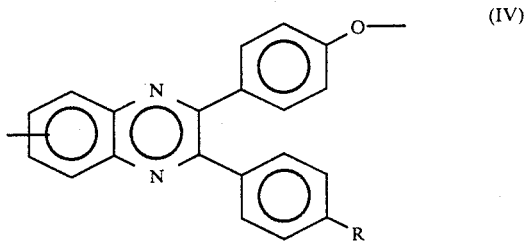

and of 0-99 mole percent of the following repeat unit of formula (V)

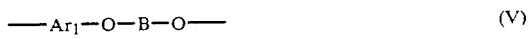

where R is selected from the group consisting of H, an alkyl group, a carbocyclic aromatic group, a heterocyclic aromatic group, or an alkoxy group, $Ar_1$ is a carbocyclic aromatic or heterocyclic aromatic group, and B is selected from the representative group consisting of:

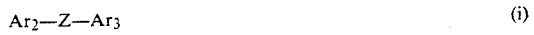

where $Ar_2$ and $Ar_3$ are the same or different carbocyclic aromatic or heterocyclic aromatic group and Z is selected from the representative group consisting of CO, SO or $SO_2$;

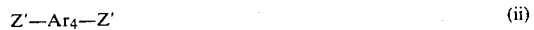

where Z' is an activated carbocyclic aromatic or heterocyclic aromatic group and $Ar_4$ is an aliphatic group, a carbocyclic aromatic or heterocyclic aromatic group. A process for manufacture a self polymerizable phenylquinoxaline subject to polymerization by aromatic nucleophilic substitution. The use of these polyphenylquinoxalines and there copolymers as thermally stable thermal plastics for use in aerospace, high temperature adhesive, microelectronic and membrane (gas and molecular separation membrane) application.

26 Claims, No Drawings

SELF POLYMERIZABLE PHENYLQUINOXALINES, THEIR PREPARATION AND USE IN POLYPHENYLQUINOXALINE HOMOPOLYMERS AND COPOLYMERS

TECHNICAL FIELD

This invention describes the manufacture of self polymerizable phenylquinoxalines and their use in the preparation of polyphenylquinoxalines and copolymers containing of self polymerizable phenylquinoxalines monomer.

The present invention relates to new polyquinoxaline homopolymers and copolymers, their use as thermoplastic in aerospace, microelectronics and membrane application such as gas separation membranes and molecular separation membranes and a process for manufacturing 2,3-diaryl substituted-6-fluoro-quinoxalines where at least one of the aryl groups is hydroxylated.

Polyquinoxalines, herein sometimes referred to as PPQ's, are a well established class of high performance thermoplastics with proven potential in aerospace, microelectronics and membrane applications.

BACKGROUND ART

PPQ's are normally prepared by the reacting of bis-alpha-carbonyl compounds with an organic tetramine. In U.S. Pat. Nos. 3,852,244 and 3,956,238, Heath et al., has disclosed the formation of polyether quinoxalines from a wide variety of polyether bis-alpha-carbonyl compounds and aromatic organic tetramines.

In "Synthesis of poly(phenylquinoxaline) with High Glass Transition Temperatures," *Polymer Prep*, 28, 71 (1987), Harris et al. has described the synthesis of various bis(phenylglyoxalyl) napthalenes and their use in the preparation of PPQ's.

In "The Synthesis and Characterization of Phenolic Hydroxyl Terminated Polyphenylquinoxaline Oligomers," *Polymer Prep*, 28, 69 (1987), Labadie et al. has described the preparation of hydroxy terminated polyphenyl quinoxalines.

In U.S. Pat. No. 3,326,915, Jackson et al. described the preparation and use of various self-polymerizable benzopyrazin or quinoxalines, but these self-polmerizable monomers are polymerized by the same classical procedures as described in Heath et al. above.

More recently, Connell et al. described in "Synthesis of Polyphenylquinoxalines via Aromatic Nucleophilic Displacement," *Polymer Prep*, 29, 172 (1988), the formation of PPQ's by reacting bis-hydroxyphenylquinoxalines with an activated difluoro monomers under aromatic nucleophilic substitution reaction conditions.

Hedrick et al. have also described in "Synthesis of Poly(aryl ether-phenylquinoxaline)" *Proceedings from Polymeric Material Science & Engineering*, 59, 42 (1988), the formation of PPQ's by reacting bis-fluoro-polyphenylated-quinoxalines with various bis-hydroxylated aromatic compounds under aromatic nucleophilic substitution reaction conditions.

However, the aromatic nucleophilic substitution process for making PPQ's still requires the purification and use of two independent components.

Thus, it appears desirable to manufacture a self polymerization quinoxaline which polymerizes under aromatic nucleophilic substitute reaction conditions to yield PPQ's and copolymers containing PPQ's incorporating the self polymerizable phenylquinoxalines. These PPQ and PPQ copolymers especially PPQ copolymers containing polyether-ether-ketone, sometimes referred herein as PEEK, repeat units or PPQ copolymers containing polyethersulfone, sometimes herein referred to as PES, repeat units have excellent thermal and mechanical properties and are ideally suited as useful thermoplastic in the areas of aerospace, high temperature adhesive, microelectronic and membrane applications. These copolymers have properties that are tunable to make high temperature thermoplastics, highly crystalline thermoplastics, lowly crystalline thermoplastics, organic soluble thermoplastics or organic insoluble thermoplastics.

DISCLOSURE OF THE INVENTION

It is an object of this invention to provide novel, self polymerizable, phenylquinoxalines incorporating within the same chemical structure an aromatic nucleophilic displacable group and a group which can displace the displacable group.

It is a further object of this invention to provide novel PPQ's prepared by polymerizing the self polymerizable phenylquinoxalines.

A further object of this invention is to provide novel PPQ copolymers based on the self polymerizable phenylquinoxalines and at lesat one other systems which can undergo aromatic nucleophilic substitution polymerization.

A further object of this invention is to provide a usable process for the manufacturing of 2,3-diaryl-6-fluoro-quinoxalines where at least one aryl group is hydroxylated.

The novel self polymerizable quinoxalines have the following formula (I):

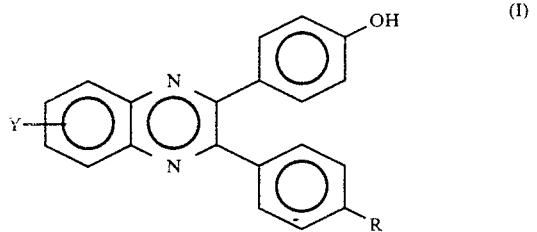

where Y is selected from the group consisting of F, Cl or NO₂ and Y is in either the 6 or 7 position of the quinoxaline ring system and where R is selected from the group consisting of H, an alkyl group having usually 1 to 16 carbon atoms, a carbocyclic aromatic group, a heterocyclic aromatic group, or an alkoxy group having usually 1 to 8 carbon atoms.

The phenylquinoxalines of formula (I) can be manufactured according to the following reaction scheme:

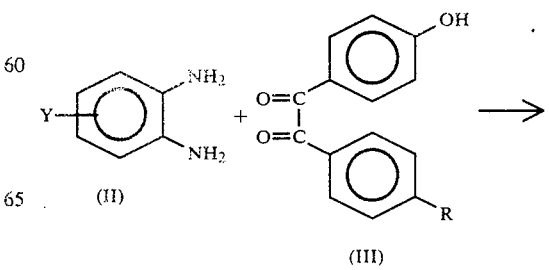

$$(I) + 2H_2O$$

where Y and R are as previously defined. Thus, a representative compound of formula (II), 4-fluoro-1,2-diaminobenzene, is reacted with a representative compound of formula (III), 4-hydroxybenzil, in the presence of a chlorinated hydrocarbon solvent such as chloroform in the presence of an strong organic acid catalyst such as trifluoroacetic acid, para-toluenesulfonic acid, or trichloroacetic acid.

The phenylquinoxalines of this invention can be used as monomers for the manufacture of PPQ's and as monomers for manufacturing copolymers containing PPQ's and other monomer systems which undergo aromatic nucleophilic substitution polymerization which consist of 1–100 mole percent and preferrably from about 10 to 100 mole percent of repeat unit of formula (IV)

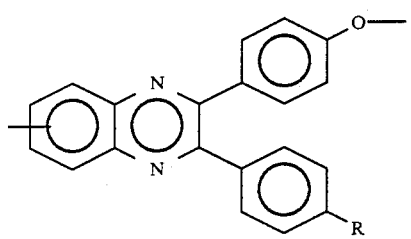

(IV)

and 0–99 mole percent and preferrably from about 90 to 0 mole precent of repeat unit formula (V)

$$—Ar_1—O—B—O—$$ (V)

where R is as previously defined, $Ar_1$ is a carbocyclic aromatic or heterocyclic aromatic group, and B is selected from the representative group consisting of:

$$Ar_2—Z—Ar_3$$ (i)

where $Ar_2$ and $Ar_3$ are the same or different a carbocyclic aromatic or heterocyclic aromatic group and Z is selected from the representative group consisting of CO, SO or $SO_2$ $$Z'—Ar_4—Z'$$ (ii)

where Z' is an activated carbocyclic aromatic or heterocyclic aromatic group and $Ar_4$ is an aliphatic group having usually 1 and 16 carbon atoms, a carbocyclic aromatic or heterocyclic aromatic group.

Repeat units of formula (V) can be made by the following reaction scheme:

$$HO—Ar_1—OH + Y—B—Y \longrightarrow (V)$$

(VI)      (VII)

where Y, $Ar_1$ and B are as previously defined. Thus, an dihydroxyaryl compound of formula (VI) such as hydroquinone (1,4-dihydroxybenzene), resorcinol (1,3-dihydroxybenzene), or various dihydroxynaphthylenes is reacted with a disubstituted B linked aryl compound such as 4,4'-difluorobenzophenone, 4,4'-difluorodiphenylsulfone, 4,4'-difluorodiphenylsulfoxide, 4,4'-dinitrobenzophenone, 4,4'-dinitrodiphenylsulfone, or 4,4'-dichlorobenzophenone.

The polymerization reaction is carried out under standard aromatic nucleophilic reaction conditions which involve mixing the monomers together in an appropriate organic solvent with excess of $K_2CO_3$ as proton absorption component and removing the water as it is formed in the case of the above described copolymers.

BEST MODE FOR CARRYING OUT THIS INVENTION

Applicants have found that the PPQ's derived from phenylquinoxalines of formula (I) or copolymers having at least 1 mole percent of repeat units derived from self polymerizable phenylquinoxaline of formula (I) represent a new and novel class of thermoplastic PPQ's. The PPQ's and copolymers of this invention are formed using a nuclephilic substitution action from a self polymerizable phenylquinoxaline which has an active leaving group such as fluorine, chlorine or nitro, displacable by a nucleophilic site on the same molecule usually an aromatic hydroxy group where the quinoxaline ring system serves as an activating group. These polymers are important because of their excellent thermomechanical properties and the mild conditions under which they are formed.

In preparing the homo PPQ's, a solution of the self polymerizing phenylquinoxaline of formula (I) is dissolved in a mixture of N-methylpyrollodone (NMP) and toluene to afford monomer solubility containing an excess of $K_2CO_3$ which absorbs the protonic acid generated during aromatic nucleophilic substitution under nitrogen. The polymer is formed as a fibrious componenet which can be dissolved in chlorinated hydrocarbons and reprecipitated from methanol. Although the self polymerizable phenylquinoxalines of formula (I) can have the leaving group Y substituted in the sixth or seventh position of the phenylquinoxaline ring system, the pure components, that is those that have either all six substituted leaving groups or seven substituted leaving groups, can be used as the self polymerizing monomer.

The use of these pure components results in homo PPQ's which have greater order and a rigidity and as well PPQ copolymers with these same enhanced properties. Copolymers using self polymerizable phenylquinoxalines of formula (I) in a mole percent greater than or equal to 1, involve reacting the phenylquinoxaline of formula (I) with preferably a near 1:1 mixture of an activated disubstituted aromatic component where the substituents are nucleophilic substitution leaving groups such as fluorine, chlorine or nitro and an aromatic diol where the diols are directly attached to an aromatic ring such as 1,4-di-hydroxy benzene. Small excess of either the aromatic diols or the disubstituted aromatic compounds are acceptable with the excess usually ranging from about 1 to 10% by weight.

These copolymers are useful in applications where the phenylquinoxaline structure increases the polymers thermal stability and imparts a different morphology to the polymer which can improve the polymers rigidity and packing efficiency resulting in improved fiber forming properties and more durable film or reinforcing agents for molecular composities.

Copolymers consisting of 51–100 mole percent of repeat units of formula (IV) and 49–0 mole percent of repeat units of formula (V) are particularly preferred for applications where the thermoplastic character of the PPQ block predominate the characteristic of the copolymer. This application include most of the standard applications that PPQ's are traditionally used for in industry. However, the incorporation of upto 49 mole percent of repeat units of formula (V) will allow modifications of the PPQ normal physical properties to accomplish polymers tailors made for a given application.

Copolymer consisting of 1–50 mole percent of repeat units of formula (IV) and 99–50 mole percent of repeat units of formula (V) represent the other side of the spectrum of copolymers, that is copolymers where the block incorporating repeat units of formula (V) predominate. These copolymers will express more of the native homopolymer characteristics of homopolymer consisting of 100 mole percent of repeat units of formula (V). However, the inclusion of at least 1 mole percent of repeat units of formula (IV) will allow wide latitude in the design of particular polymers for a given application.

The copolymers which incorporate PEEK blocks show a variation in copolymer properties as the amount of PEEK [poly(ether-ether ketones] content is increased. In the 25 to 50 mole present of PEEK block incorporated in the the copolymer a shift in the copolymers final properties in that the $T_g$ increases from a $T_g$ platuea that dominates the copolymers from 50 to 90 percent PEEK composition.

In the case of PPQ-PEEK copolymers, the compounds of formula (VI) which are particularly preferred are selected from the illustrative and representative group consisting of hydroquinone (1,4-dihydroxybenzene), resorcinol (1,3-dihydroxybenzene), or various dihydroxynaphthylenes; while the particularly preferred compounds of formula (V) are selected from the illustrative and representative group consisting of 4,4'-difluorobenzophenone, 4,4'-dinitrobenzophenone, or 4,4'-dichlorobenzophenone.

The incorporation of PES (polyethersulfone) on the other hand only causes a steedy increase in the $T_g$ of the copolymers as the mole percent is increased from 25 to 75%.

In the case of PPQ-PES copolymers, the compounds of formula (VI) which are particularly preferred are selected from the illustrative and representative group consisting of hydroquinone (1,4-dihydroxybenzene), resorcinol (1,3-dihydroxybenzene), or various dihydroxynaphthylenes; while the particularly preferred compounds of formula (V) are selected from the illustrative and representative group consisting of 4,4'-difluorodiphenylsulfone, 4,4'-dinitrodiphenylsulfone or 4,4'-dichlorodiphenylsulfone.

Other dihydroxy compound of formula (IV) include 4,5-bis(4-hydroxyphenyl)-2-phenylimidazole. Other difluoro compounds of formula (V) are selected from the illustrative and representative group consisting of 1,3-bis(4-fluorobenzoyl)benzene, 1,4-bis(4-fluorobenzoyl)benzene, 4,4'-bis(4-fluorobenzoyl)diphenylether, 4,4'-bis (4-fluorobenzoyl)diphenylmethane, 4,4'-bis(4-fluorobenzoyl)diphenylsulfone, 2,6-bis(4-fluorobenzoyl)naphthalene or 4,4'-bis(4-fluorobenzoyl)biphenyl.

The invention will be better understood by reference to the following examples which are included for the purpose of illustration and not limitation.

EXAMPLE 1

Preparation of Self-Polymerizable Phenylouinoxalines

This example illustrates the preparation of a near 50-50 mixture of 2-phenyl-3-(4-hydroxyphenyl)-6-fluoroquinoxaline and 2-(4-hydroxyphenyl)-3-phenyl-6-fluoroquinoxaline.

To a one liter round-bottomed flask equipped with an overhead stirrer and a reflux condensor was added 73.12 grams (0.323 moles) of 4-hydroxybenzil, 40.77 grams (0.323 moles) of 4-fluoro-1,2-diaminobenzene and 500 mls of chloroform. After 5 drops of trifluoroacetic acid was added, the solution was stirred and heated at reflux for 5 hrs. The solution was allowed to cool to room temperature, extracted with 300 mls of water, and dried over MgSO$_4$. After the solvent was removed under reduced pressure, the residue was recrystallized 3 times from 95% ethanol to yield 92.97 grams (91%) of a bright yellow powder formula (Ia):

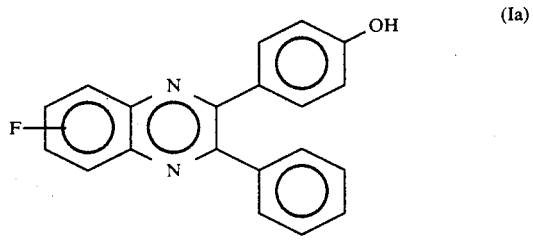

Compound (Ia) had the following physical properties: mp=82°-117° C.; IR (KBr) 1600 cm$_{-1}$ quinoxaline absorption, 3123 cm$_{-1}$ OH absorption; $^1$H-NMR (CDCl$_3$) 6.6 ppm (s, 1H, OH) and 7.3-8.3 ppm (m, 12H, aromatic). Anal. Calcd. C$_{20}$H$_{13}$FN$_2$O: C, 75.94; H 4.14. Actual: C, 76.04; H, 4.20.

EXAMPLE 2

Homopolymerization

This example illustrates the preparation of a PPQ homopolymer based on the self polymerizable phenylquinoxaline of formula (Ia) prepared in Example 1.

25 grams (0.079 moles) of monomer (Ia) from example 1 was dissolved in 200 mls of a 50:50 (v/v) solutions of NMP/toluene containing excess K$_2$O$_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: [n]=1.23 dl/g, T$_g$=247° C., and TGA (5% weight loss) 555° D. (N$_2$) and 565° C. (air), and was soluble in NMP, DMAc, m-cresol, and chlorinated hydrocarbons.

A thin film (3 mil) of the homopolymer was cast from NMP and subjected to preliminary stress-strain measurements according to ASTM D882. The tensile strength of the film was 107±6 MPa (15,515 PSI) and its tensile modulus was 3.18±0.15 GPa (461,100 PSI).

A sample of the homopolymer was compression molded at 300° C. and 1000 PSI. Preliminary measurements on the molded specimen gave a flexural modulus of 2.8±0.3 MPa and G$_{1C}$=0.68±0.11 N-m/m$^2$.

EXAMPLE 3

This example illustrates the preparation of a PPQ homopolymer based on either a pure 2-phenyl-3-(4-hydroxyphenyl) -6-fluoro-quinoxaline or pure 2-(4-hydroxyphenyl) -3-phenyl-6-fluoro-quinoxaline.

25 grams (0.079 moles) of 2-(4-hydroxy phenyl)-3-phenyl-6-fluoroquinoxaline from example 1 is dissolved in 200 mls of a 50:50 (v/v) solutions of NMP/toluene containing excess $K_2O_3$ under nitrogen. The mixture is stirred for 4 hrs at 160° C. during which time the water of condensation is collected in a Dean Stark trap. The toluene is then removed as the mixture is heated to 190° C. for 1 hr. The temperature is then raised to 202° C. for an additional hr. The dark red mixture is diluted with 200 mls NMP and added to 2000 mls of a stirred 75:25 (v/v) solution of methanol/acetic acid. The fibrous white PPQ is collected by filtration, dissolved in chloroform and filtered. The polymer is reprecipitated into methanol and in refluxing water; and then dried at 150° C. under reduced pressure for 18 hrs.

PREPARATION OF PPO-PEEK CO-POLYMERS

EXAMPLE 4

This example illustrates the preparation of a PPQ-PEEK copolymer consisting of 75 mole percent of a PPQ repeat unit of formula (II) based on the self polymerizable phenylquinoxalines of formula (Ia), prepared in Example 1, and 25 mole percent of a PEEK repeat unit of formula (III) based on the reaction of hydroquinone and 4,4'-difluorobenzophenone.

18.75 grams (0.0593 moles) of self polymerizable phenylquinoxaline (Ia) from example 1, 1.07 grams (0.0099 moles) of hydroquinone, and 2.155 grams (0.0099 moles) of 4,4'-difluorobenzophenone were dissolved in 200 mls of a 50:50 (v/v) solutions of NMP/toluene containing excess $K_2CO_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PEEK copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: $[n]=0.81$ dl/g in m-cresol at 30.1° C., and $T_g=222°$ C.

EXAMPLE 5

This example illustrates the preparation of a PPQ-PEEK copolymer consistinq of 50 mole percent of a PPQ repeat units of formula (II) based on the self polymerizable phenylquinoxalines of formula (Ia), prepared in Example 1, and 50 mole percent of a PEEK repeat unit of formula (III) based on the reaction between hydroquinone and 4,4'-difluorobenzophenone.

12.5 grams (0.0395 moles) of self polymerizable phenylquinoxaline (Ia) from example 1, 2.175 grams (0.0198 moles) of hydroquinone, and 4.309 grams (0.0198 moles) of 4,4'-difluorobenzophenone were dissolved in 200 mls of a 50:50 (v/v) solutions of NMP/toluene containing excess $K_2CO_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PEEK copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: $[n]=1.19$ dl/g in m-cresol at 30.1° C. and $T_g=170°$ C.

EXAMPLE 6

This example illustrates the preparation of a PPQ-PEEK copolymer consisting of 25 mole percent of a PPQ repeat units of formula (II) based on the self polymerizable phenylquinoxalines of formula (Ia), prepared in Example 1, and 75 mole percent of a PEEK repeat unit of formula (III) based on the reaction between hydroquinone and 4,4'-difluorobenzophenone.

6.25 grams (0.0198 moles) of self polymerizable phenylquinoxaline (Ia) from example 1, 3.262 grams (0.0296 moles) of hydroquinone, and 6.464 grams (0.0296 moles) of 4,4'-difluorobenzophenone were dissolved in 200 mls of a 50:50 (v/v) solutions of NMP/toluene containing excess $K_2CO_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PEEK copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: $[n]=1.08$ dl/g in conc. $H_2SO_4$ at 30.1° C. and $T_g=170°$ C.

EXAMPLE 7

This example illustrates the preparation of a PPQ-PEEK copolymer consisting of 10 mole percent of a PPQ repeat units of formula (II) based on the self polymerizable phenylquinoxalines of formula (Ia), prepared in Example 1, and 90 mole percent of a PEEK repeat unit of formula (III) based on the reaction between hydroquinone and 4,4'-difluorobenzophenone.

2.5 grams (0.0079 moles) of self polymerizable phenylquinoxaline (Ia) from example 1, 3.914 grams (0.0356 moles) of hydroquinone, and 7.757 grams (0.0356 moles) of 4,4'-difluorobenzophenone were dissolved in 200 mls of a 50:50 (v/v) solutions of NMP/toluene containing excess $K_2CO_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/a- cetic acid. The fibrous white PPQ-PEEK copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: [n]=0.37 dl/g in conc. H$_2$SO$_4$ at 30.1° C., T$_g$=165° C., and T$_m$=320° C.

PREPARATION OF PPO-PES CO-POLYMERS

EXAMPLE 8

This example illustrates the preparation of a PPQ-PES copolymer consisting of 75 mole percent of a PPQ repeat unit of formula (II) based on the self polymerizable phenylquinoxalines of formula (Ia), prepared in Example 1, and 25 mole percent of a PES repeat unit of formula (III) based on the reaction of hydroquinone and 4,4'-difluorodiphenylsulfone.

18.75 grams (0.0593 moles) of self polymerizable phenylquinoxaline (Ia) from example 1, 1.087 grams (0.0099 moles) of hydroquinone, and 2.511 grams (0.0099 moles) of 4,4'-difluorodiphenylsulfone were dissolved in 200 mls of a 0:50 (v/v) solutions of NMP/toluene containing excess K$_2$CO$_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PES copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: [n]=1.06 dl/g in m-cresol at 30.1° C. and T$_g$=240° C.

EXAMPLE 9

This example illustrates the preparation of a PPQ-PES copolymer consisting of 50 mole percent of a PPQ repeat units of formula (II) based on the self polymerizable phenylquinoxalines of formula (Ia), prepared in Example 1, and 50 mole percent of a PES repeat unit of formula (III) based on the reaction between hydroquinone and 4,4'-difluorodiphenylsulfone.

12.5 grams (0.0395 moles) of self polymerizable phenylquinoxaline (Ia) from example 1, 2.175 grams (0.0198 moles) of hydroquinone, and 5.022 grams (0.0198 moles) of 4,4'-difluorodiphenylsulfone were dissolved in 200 mls of a 50:50 (v/v) solutions of NMP/toluene containing excess K$_2$CO$_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PES copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: [n]=1.16 dl/g in m-cresol at 30.1° C. and T$_g$=232° C.

EXAMPLE 10

This example illustrates the preparation of a PPQ-PES copolymer consisting of 25 mole percent of a PPQ repeat units of formula (II) based on the self polymerizable phenylquinoxalines of formula (Ia), prepared in Example 1, and 75 mole percent of a PES repeat unit of formula (III) based on the reaction between hydroquinone and 4,4'-difluorodiphenylsulfone.

6.25 grams (0.0198 moles) of self polymerizable phenylquinoxaline (Ia) from example 1, 3.262 grams (0.0296 moles) of hydroquinone, and 7.532 grams (0.0296 moles) of 4,4'-difluorodiphenylsulfone were dissolved in 200 mls of a 50:50 (v/v) solutions of NMP/toluene containing excess K$_2$CO$_3$ under nitrogen. The mixture was stirred for 4 hrs at 160° C. during which time the water of condensation was collected in a Dean Stark trap. The toluene was then removed as the mixture was heated to 190° C. for 1 hr. The temperature was then raised to 202° C. for an additional hr. The dark red mixture was diluted with 200 mls NMP and added to 2000 mls of a stirred 75:25 (v/v) solution of methanol/acetic acid. The fibrous white PPQ-PES copolymer was collected by filtration, dissolved in chloroform and filtered. The polymer was reprecipitated into methanol and in refluxing water; and then dried at 150° C. under reduced pressure for 18 hrs.

The homopolymer was obtained as a white fibrous material which displayed the following properties: [n]=1.08 dl/g in H$_2$SO$_4$ at 30.1° C. and T$_g$=219° C.

All of the PEEK and PES copolymers of examples 4-10 had decomposition temperatures (temperature until a 5% weight loss occurs in the TGA spectra) between 500 and 565° C. in nitrogen and between 505° and 550° C. in air.

What is claimed is:

1. A polyphenylquinoxaline which consists of 1 to 100 mol percent of structural elements of the formula (IV)

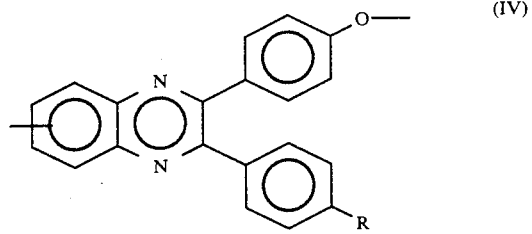

and of 0-99 mole percent of the folowing repeat unit of formula (V)

where R is selected from the group consisting of H, an alkyl group, a carbocyclic aromatic group, a heterocyclic aromatic group, or an alkoxy group, Ar$_1$ is a carbocyclic aromatic or heterocyclic aromatic group, and B is selected from the representative group consisting of:

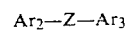

where Ar₂ and Ar₃ are the same or different carbocyclic aromatic or heterocyclic aromatic group and Z is selected from the representative group consisting of CO, SO or SO₂;

Z'—Ar₄—Z'  (ii)

where Z' is an activated carbocyclic aromatic or heterocyclic aromatic group and Ar₄ is an aliphatic group, a carbocyclic aromatic or heterocyclic aromatic group.

2. A polyphenylquinoxaline according to claim 1 wherein said polymer comprises 100 mole percent of repeat unit of formula (IV) where R is selected from the group consisting of H, an alkyl group with between 1 to 16 carbon atoms, a carbocyclic aromatic group, a heterocyclic aromatic group, or an alkoxy group with between 1 to 8 carbon atoms, Ar₁ a carbocyclic aromatic or heterocyclic aromatic group, and B is selected from the representative group consisting of:

Ar₂—Z—Ar₃  (i)

where Ar₂ and Ar₃ are the same of different a carbocyclic aromatic or heterocyclic aromatic group and Z is selected from the representative group consisting of CO, SO or SO₂;

Z'—Ar₄—Z'  (ii)

where Z' is an activated carbocyclic aromatic or heterocyclic aromatic group and Ar₄ is an aliphatic group, a carbocyclic aromatic or heterocyclic aromatic group.

3. A polyphenylquinoxaline according to claim 1, wherein R is hydrogen.

4. A polyphenylquinoxaline according to claim 1, wherein R is an alkyl group with between 1 to 16 carbon atoms.

5. A polyphenylquinoxaline according to claim 1, wherein R is an alkoxy group with between 1 to 8 carbon atoms.

6. A polyphenlyquinoxaline according to claim 1, wherein B is ps
Ar₂—Z—Ar₃  (i)

where Ar₂ and Ar₃ are independently a carbocyclic aromatic or heterocyclic aromatic group and Z is selected from the representative group consisting of CO, SO or SO₂.

7. A polyphenylquinoxaline according to claim 1, wherein B is

Z'—Ar₄—Z'  (ii)

where Z' is an activated carbocyclic aromatic or heterocyclic aromatic group and Ar hd 4 1 is an aliphatic group, a carbocyclic aromatic or heterocyclic aromatic group.

8. A polyphenylquinoxaline according to claim 7, wherein Ar₄ is an aliphatic group with between 1 and 16 carbon atoms.

9. A polyphenylquinoxaline according to claim 1, wherein Ar₁ is derived from the compounds of formula (IV) selected from the representative group consisting of hydroquinone (1,4-dihydroxybenzene), resorcinol (1,3-dihydroxybenzene), or various dihydroxynaphthylenes and wherein B is derived from the compounds of formula (V) selected from the representative group consisting of 4,4'--difluorobenzophenone, 4,4'-dinitrobenzophenone, or 4,4'-dichlorobenzophrnone.

10. A polyphenylquinoxaline according to claim 1, wherein Ar₁ is derived from the compounds of formula (IV) selected from the representative group consisting of hydroquinone (1,4-dihydroxybenzene), resorcinol (1,3-dihydroxybenzene), or various dihydroxynaphthylenes and wherein B is derived from the compounds of formula (V) selected from the representative group consisting of 4,4'-difluorodiphenvlsulfone, 4,4'-dinitrodiphenylsulfone, or 4,4'-dichlorodiphenylsulfone.

11. A polyphenylquinoxaline which consists of 1 to 50 mole percent of structural elements of the formula (IV)

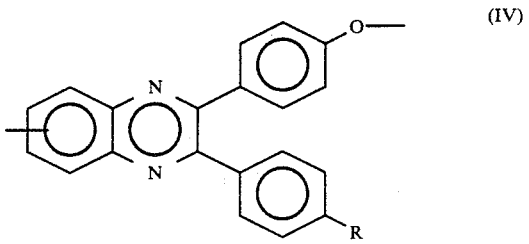

and of 99–50 mole percent of the following repeat unit of formula (V)

where R is selected from the group consisting of H, an alkyl group with between 1 to 16 carbon atoms, a carbocyclic aromatic group, a heterocyclic aromatic group, or an alkoxy group with between 1 to 8 carbon atoms, Ar₁ a carbocyclic aromatic or heterocyclic aromatic group, and B is selected from the representative group consisting of:

Ar₂—Z—Ar₃  (i)

where Ar₂ and Ar₃ are independently a carbocyclic aromatic or heterocyclic aromatic group and Z is selected from the representative group consisting of CO, SO or SO₂;

Z'—Ar₄—Z'  (ii)

where Z' is an activated carbocyclic aromatic or heterocyclic aromatic group and Ar₄ is an aliphatic group with between 1 and 16 carbon atoms, a carbocyclic aromatic or heterocyclic aromatic group.

12. A polyphenylquinoxaline according to claim 11 wherein said polymer comprises 100 mole percent of repeat unit of formula (IV) where R is selected from the group consisting of H, an alkyl group with between 1 to 16 carbon atoms, a carbocyclic aromatic group, a heterocyclic aromatic group, or an alkoxy group with between 1 to 8 carbon atoms, Ar₁ a carbocyclic aromatic or heterocyclic aromatic group, and B is selected from the representative group consisting of:

Ar₂—Z—Ar₃  (i)

where Ar₂ and Ar₃ are independently a carbocyclic aromatic or heterocyclic aromatic group and Z is selected from the representative group consisting of CO, SO or SO₂;

Z'—Ar₄—Z'  (ii)

where Z' is an activated carbocyclic aromatic or heterocyclic aromatic group and $Ar_4$ is an aliphatic group with between 1 and 16 carbon atoms, a carbocyclic aromatic or heterocyclic aromatic group.

13. A polyphenylquinoxaline according to claim 11, wherein R is hydrogen.

14. A polyphenylquinoxaline according to claim 11, wherein R is an alkyl group with between 1 to 16 carbon atoms.

15. A polyphenylquinoxaline according to claim 1, wherein R is an alkoxy group with between 1 to 8 carbon atoms.

16. A polyphenlyquinoxaline according to claim 10, wherein B is $$Ar_2-Z-Ar_3 \qquad (i)$$

where $Ar_2$ and $Ar_3$ are independently a carbocyclic aromatic or heterocyclic aromatic group and Z is selected from the representative group consisting of CO, SO or $SO_2$.

17. A polyphenylquinoxaline according to claim 10, wherein B is $$Z'-Ar_4-Z' \qquad (ii)$$

where Z' is an activated carbocyclic aromatic or heterocyclic aromatic group and $Ar_4$ is an aliphatic group with between 1 and 16 carbon atoms, a carbocyclic aromatic or heterocyclic aromatic group.

18. A polyphenylquinoxaline which consists of 51 to 100 mole percent of structural elements of the formula (IV)

and of 49-0 mole percent of the following repeat unit of formula (V)

$$—Ar_1-O-B-O— \qquad (V)$$

where R is selected from the group consisting of H, an alkyl group with between 1 to 16 carbon atoms, a carbocyclic aromatic group, a heterocyclic aromatic group, or an alkoxy group with between 1 to 8 carbon atoms, $Ar_1$ a carbocyclic aromatic or heterocyclic aromatic group, and B is selected from the representative group consisting of:

$$Ar_2-Z-Ar_3 \qquad (i)$$

where $Ar_2$ and $Ar_3$ are independently a carbocyclic aromatic or heterocyclic aromatic group and Z is selected from the representative group consisting of CO, SO or $SO_2$;

$$Z'-Ar_4-Z' \qquad (ii)$$

where Z' is an activated carbocyclic aromatic or heterocyclic aromatic group and $Ar_4$ is an aliphatic group with between 1 and 16 carbon atoms, a carbocyclic aromatic or heterocyclic aromatic group.

19. A polyphenylquinoxaline according to claim 18, wherein said polymer comprises 100 mole percent of repeat unit of formula (IV) where R is selected from the group consisting of H, an alkyl group with between 1 to 16 carbon atoms, a carbocyclic aromatic group, a heterocyclic aromatic group, or an alkoxy group with between 1 to 8 carbon atoms, $Ar_1$ a carbocyclic aromatic or heterocyclic aromatic group, and B is selected from the representative group consisting of:

$$Ar_2-Z-Ar_3 \qquad (i)$$

where $Ar_2$ and $Ar_3$ are independently a carbocyclic aromatic or heterocyclic aromatic group and Z is selected from the representative group consisting of CO, SO or $SO_2$;

$$Z'-Ar_4-Z' \qquad (ii)$$

where Z' is an activated carbocyclic aromatic or heterocyclic aromatic group and $Ar_4$ is an aliphatic group with between 1 and 16 carbon atoms, a carbocyclic aromatic or heterocyclic aromatic group.

20. A polyphenylquinoxaline according to claim 18, wherein R is hydrogen.

21. A polyphenlyquinoxaline according to claim 18, wherein B is $$Ar_2-Z-Ar_3 \qquad (i)$$

where $Ar_2$ and $Ar_3$ are independently a carbocyclic aromatic or heterocyclic aromatic group and Z is selected from the representative group consisting of CO, SO or $SO_2$.

22. A polyphenylquinoxaline according to claim 18, wherein B is $$Z'-Ar_4-Z' \qquad (ii)$$

where Z' is an activated carbocyclic aromatic or heterocyclic aromatic group and $Ar_4$ is an aliphatic group with between 1 and 16 carbon atoms, a carbocyclic aromatic or heterocyclic aromatic group.

23. A process for preparing a self polymerizable phenylquinoxaline of formula (I) which comprises steps of:
  mixing a diamine of the formula (II) with a benzil of formula (III) in a chlorinated hydrocarbon containing a small amount of an acid catalyst; and
  heating the mixture to afford a self polymerizable phenylquinoxaline of formula (I).

24. A phenylquinoxaline process according to claim 23, wherein the diamine is 4-fluoro-1,2-diaminobenzene.

25. A phenylquinoxaline process according to claim 23, wherein the benzil is 4-hydroxy-benzil.

26. A phenylquinoxaline process according to claim 23, wherein the acid catalyst is selected from the representative group consisting of trifluoroacetic acid, para-toluenesulfonic acid, or trichloroacetic acid.

* * * * *